United States Patent

[11] 3,581,633

| [72] | Inventors | Naoyuki Uno<br>Iruma-gun-Saitama-ken;<br>Katsuhiko Nomura, Tokyo-to, both of,<br>Japan |
|---|---|---|
| [21] | Appl. No. | 762,853 |
| [22] | Filed | Sept. 26, 1968 |
| [45] | Patented | June 1, 1971 |
| [73] | Assignee | Asahi Kogaku Kogyo Kabushiki Kaisha<br>Tokyo-to, Japan |
| [32] | Priority | Oct. 3, 1967 |
| [33] | | Japan |
| [31] | | 42/83746 |

[54] CAMERA SHUTTER
9 Claims, 3 Drawing Figs.

[52] U.S. Cl. ........................................ 95/10,
95/42, 95/53
[51] Int. Cl. .................................... G03b 7/08,
G03b 9/62
[50] Field of Search ............................ 95/10 C,
42, 53

[56] References Cited
UNITED STATES PATENTS

| 3,324,779 | 6/1967 | Nobusawa et al. | 95/10(C)X |
| 3,349,678 | 10/1967 | Suzuki et al. | 95/10(C) |
| 3,437,026 | 4/1969 | Espig | 95/53 |
| 3,437,027 | 4/1969 | Straub | 95/53 |

*Primary Examiner*—Samuel S. Matthews
*Assistant Examiner*—Joseph F. Peters, Jr.
*Attorney*—Stanley Wolder ABSTRACT: An electrically timed camera shutter includes a timing and switching network connected to an energizing battery through a pair of parallel normally open first and second switches. The first switch is closed by the shutter opening release button which also unlatches a spring actuated lever which closes the second switch. The lever is retracted with the initiation of the shutter closing to open the second switch. The network energizes and deenergizes a solenoid for holding open and releasing the shutter to its closed position and in an alternative arrangement instead of a lever, a solenoid energized by the network output controls the second switch.

Patented June 1, 1971
3,581,633
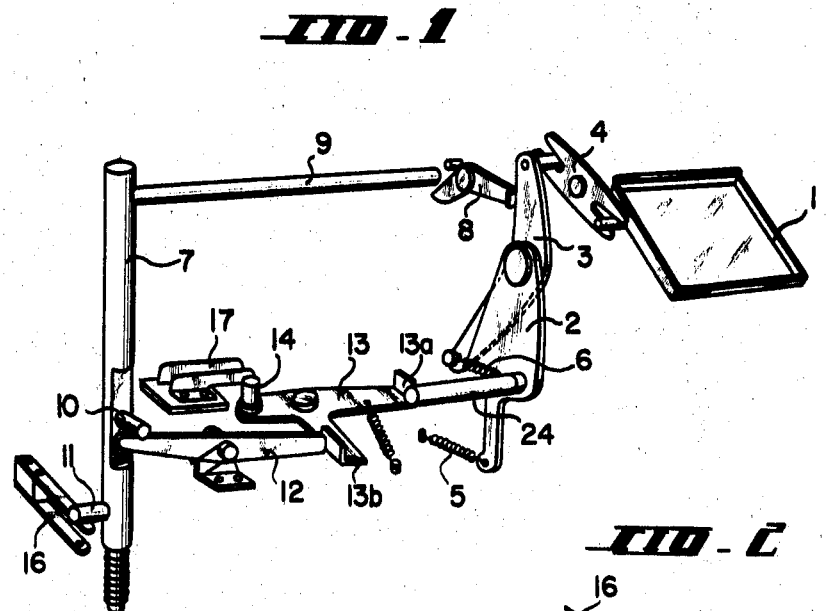
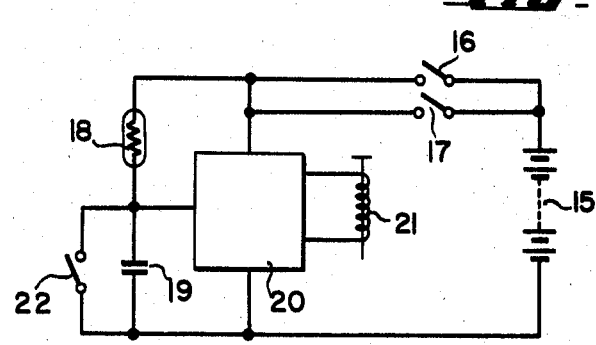
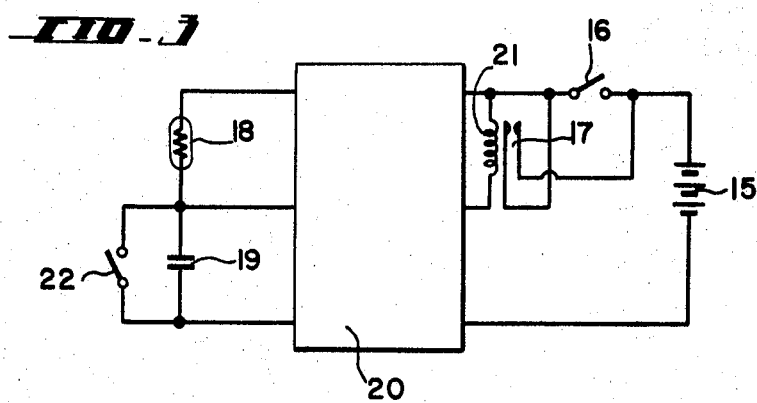
INVENTOR
NAOYUKI UNO
KATSUHIKO NOMURA
BY *Stanley Wolder*
ATTORNEY

CAMERA SHUTTER

BACKGROUND OF THE INVENTION

The present invention relates generally to improvements in camera shutter mechanisms and it relates particularly to an improved electrically timed shutter system.

Photographic cameras having electrical exposure time control shutter arrangements are widely employed, in which the shutter mechanism is provided with a timing circuit comprising a photoconductor and a capacitor, a switching circuit and amplifying circuit and in which the shutter mechanism operates in such a manner that the timing circuit operation is initiated with the opening of the shutter, such as in a drive connection with the start of the run of the leading screen and, after the lapse of an exposure interval determined by the timing circuit operation, the current supply to the electromagnetic device which has been holding the shutter open, such as by retaining the lagging screen is stopped through the operation of said switching and amplifying circuit, thus permitting the lagging screen to run and close the shutter.

A shutter of this type consumes large electric power as compared to the capacity of the battery commonly used. Accordingly, it is necessary that a power source switch be provided in the current supply circuit so as to be closed only during photographing operation, thus preventing wasteful consumption of the battery power. There have been proposed two systems for operating such power source switch. In one such system the switch is operated independently of the shutter operation, while in the other system the switch is operated in drive connection with the shutter actuating operation, such as with the release button depressing operation.

An important drawback of the former system is that the user often forgets to close the switch before photographing, or to open the switch after photographing, resulting in nonoperation of the camera or waste of the battery respectively. Accordingly, the use of the latter system is preferred.

In the conventional form of the above-mentioned latter type, the power source switch is so arranged as to be closed when the actuated shutter button reaches its depressed position, and the shutter button is latched at this depressed position until the lagging screen starts its closing, at which time the shutter button is released. This is because the power source switch must keep the control network energized at least until the current supply to the electromagnetic device is stopped under control of the timing circuit.

The above conventional system has important disadvantages. A complicated mechanism is necessary to latch and release the shutter button and it is disagreeable and uneasy for the user to feel on the finger the shock of the abruptly rising shutter button as it is released from the latched state and starts its returning movement after the shutter release is completed.

SUMMARY OF THE INVENTION

It is a principal object of the present invention to provide an improved camera shutter system.

Another object of the present invention is to provide an improved electrically controlled camera shutter system.

Still another object of the present invention is to provide an improved camera shutter system having a light controlled exposure timing network.

A further object of the present invention is to provide an automatic exposure time camera shutter system wherein the consumption of electric current is minimized and any use thereof except during the exposure sequence is obviated.

Still a further object of the present invention is to provide an automatic shutter of the above nature which is simple, inexpensive, rugged and reliable.

The above and other objects of the present invention will become apparent from a reading of the following description taken in conjunction with the accompanying drawing which illustrates preferred embodiments thereof.

In a sense the present invention contemplates the provision in a camera including an objective lens shutter means successively movable to open and closed positions, defining an exposure interval, a control network including a timing circuit and a switch circuit having an input coupled to said timing circuit and an output exposure terminating means responsive to the output of said control network for effecting the closure of said shutter, switching means connected to said network and switchable between network actuating and deactuating states, a shutter release member for initiating the opening of said shutter, means responsive to said shutter release member for actuating said switching means to said network actuating state, and retention means for maintaining said switching means in said network actuating state independently of the position of said shutter release member and during said shutter open position and effecting the switching of said switching means to said network deactuating state following the initiating of the closing of said shutter.

According to a preferred form of the improved shutter system, the switching means includes a pair of parallel normally open first and second switches connected between the control network and the energizing battery therefor. The timing circuit includes a series connected capacitor and photoconductor and a normally closed switch shunting the capacitor and maintained open during the shutter open interval. A solenoid is connected to the control network output and controls the release of the shutter to its closed position. The shutter release button in its depressed condition closes the first switch and actuates a latch which releases a spring urged lever to close the second switch, the lever being retracted to its latched position following initiation of the shutter closing sequence. In the alternative the second switch is closed during the exposure interval by a solenoid connected to the control network output.

The improved system avoids the drawbacks and disadvantages of the conventional systems heretofore proposed, and is simple, inexpensive, compact, highly reliable and convenient to use.

BRIEF DESCRIPTION OF THE DRAWING

FIG. 1 is a perspective view of the switch control mechanism of a preferred embodiment of the present invention;

FIG. 2 is a schematic circuit diagram of exposure time control network in accordance with the present invention and associated with the mechanism illustrated in FIG. 1; and FIG. 3 is a schematic circuit diagram of another embodiment of the present invention.

DESCRIPTION OF THE PREFERRED EMBODIMENTS

Referring now to the drawings, and particularly FIGS. 1 and 2 thereof, which illustrate a preferred embodiment of the present invention as shown by way of example in a single lens reflex camera, the reference numeral 1 generally designates a hinged mirror controlled by a well-known quick-return mirror mechanism comprising an energizing lever 2, a drive lever 3, an intermediate lever 4, a return spring 5 and a drive-power energizing spring 6. A depressable spring returned shutter release button 7 is provided with a radial pin 9 registering with and for controlling a crank lever 8 for holding the said quick-return mirror mechanism in its viewing position in the well-known manner. The shutter button 7 is further provided with a radial pin 10 and a radial pin 11 which are secured thereto. Within the path of the downward movement of the pin 10 there is provided a pivoted engaging or latching lever 12 spring urged so that one end thereof normally tends to abut the underface of pin 10. A three-armed lever 13 is provided with one flanged end thereof 13a positioned within the return movement path of a pin 24 extending from the energizing lever 2, another flanged end 13b extending so as to abut against the other end of the engaging lever 12, and the third end thereof being provided with a pin 14 secured thereto.

A normally open first switch 16 includes an actuating arm located in the path of movement of the pin 11 so that depression of the shutter release button 7 effects the closing of the switch 16. A normally open second switch 17 includes an actuating arm located in the path of movement of the pin 14 so that release of the lever 13 and the spring advance thereof effects the closing of switch 17. The switches 16 and 17 are connected in parallel between a terminal of an energizing battery 15 and the shutter control network 20, the network 20 being of known construction and including an amplifier and switch network and being responsive to a predetermined voltage at its input to trigger its output.

A conventional light responsive RC timing circuit includes a photoconductor 18 and a capacitor 19 connected in series across the battery 15 through the parallel switches 16 and 17. A normally closed switch 22 shunts the capacitor 19 and, in the known manner is opened with the opening of the camera shutter and kept open during the exposure interval. A solenoid or electromagnet is connected through the output of the control network 20 and switches 16 and 17 to battery 15 and when energized retains the open shutter in an open position and when deenergized releases the shutter to a closed position. The capacitor 19 is connected across the input of control network 20.

The modified system illustrated in FIG. 3 of the drawings differs from that first described only in the arrangement for controlling the switch 17. Specifically, the switch 17 which is in parallel with the switch 16 is normally open and is actuated to its closed position by the energization of the solenoid 21 which is connected to the output of the network 20 and controls the closing of the shutter as described above. Alternatively a solenoid other than that retaining the shutter in its open position may control the closing of the switch 17 and is connected to the output of network 20. Moreover, the switch 17 may be of the noncontact or solid state type and similarly controlled by the network 20. Thus, the switch 17 is kept closed for the interval that the solenoid which keeps the shutter open is energized or in a shutter open condition. In all other respects, the system illustrated in FIG. 3 is similar to that first described.

The operation of the camera according to the present invention is as follows:

Upon the cocking or energization of the shutter concurrently with the film winding operation, the energizing lever 2 of the quick-return mirror mechanism is swung counterclockwise, as viewed in FIG. 1, stretching the drive energizing spring 6 and the return spring 5, and is brought to the position as shown in FIG. 1. In this state, the three-armed lever 13 is held in the position shown in FIG. 1 with one end thereof 13b engaging one end of the engaging lever 12 due to the spring urge. The pin 14 is in its retract position and the switch 17 is accordingly open. The actuating switch 16 is also open with the shutter button 7 in its normal raised position. Thus, the current source circuit of the electrical exposure time control arrangement is open, and the camera is ready to start photographing operation.

When the shutter button 7 is depressed, first the pin 11 closes the actuating switch 16 and the electrical exposure time control circuit starts its operation. Current is supplied to the electromagnet 21 so that the excited electromagnet 21 is in a state to prevent the shutter from closing. Simultaneously with the action of the pin 11, the pin 10 pushes down one end of the engaging lever 12 so that the other end of the lever 12 moves out of engagement with the end 13b of the three-armed lever 13. As a result, the spring urged three-armed lever 13 is swung clockwise until the end 13a is brought into engagement with the pin 24 of the energizing lever 2. This swing movement of the three-armed lever 13 causes the pin 14 to close the switch 17. After closure of the switches 16 and 17, the continued depression of the shutter button 7 causes the pin 9 to act upon the engaging lever 8 to actuate the quick-return mirror mechanism. The drive lever 3 is disengaged from the engaging lever 8 and, under the influence of the drive energizing spring 6, swings counterclockwise so that the mirror is swung up and withdrawn from the objective light path. At the end of the mirror swing-up operation, the shutter is released and opened. Simultaneously with this shutter opening operation, the short circuit switch 22 of the capacitor 19 of the time delay circuit is opened and the time control operation is started.

After the lapse of a certain time in accordance with the resistance value of the photoconductor 18, owing to the operation of the control circuit 20, current supply to the electromagnet 21 is stopped so that the shutter closure preventing operation of the electromagnet 21 is terminated and the shutter is closed. At the end of the shutter closing operation, the energized position holding operation of the energizing lever 2 is terminated so that, due to the action of the return spring 5, the lever 2 swings clockwise, thus performing a return movement. At this time, the pin 24 extending from the lever 2 pushes the one end 13a of the three-armed lever 13. Accordingly, the end 13b of the three-armed lever 13 is returned to the position where it engages the lever 12, and, at the same time, the pin 14 withdraws from the position where it actuates the switch 17 so that the switch 17 is opened.

If during the above shutter operation the shutter button has already returned to its normal position after it is depressed to the extent that causes the shutter release actuation and the depressing operation has been terminated, then first the actuating switch 16 is opened and then, upon opening of the switch 17 caused by termination of shutter release operation, the current source circuit is opened. On the other hand, if the shutter release operation is terminated before the termination of depressing operation of the shutter button 7, as is the case with high speed shutter control, then the upward return movement of the shutter button 7 due to termination of depressing operation causes the actuating switch 16 to be opened, resulting in opening of the current source circuit.

In the operation of the arrangement shown in FIG. 3, when depression of the shutter button 7 causes the actuating switch 16 to be closed and the electromagnet 21 is excited, the parallelly provided switch 17, which is responsive to the action of the electromagnet 21, is closed and keeps the current source circuit closed irrespective of whether the said actuating switch 16 is opened or closed. Then, after the lapse of a time after shutter opening, due to the action of the control circuit 20 current supply to the electromagnet 21 is stopped and the shutter closing operation is initiated and, at the same time, the parallelly provided switch 17 is opened, thus opening the current source circuit.

Thus, in the camera of the present invention, the actuating switch 16 and the parallelly provided switch 17 are provided as the power source switch. The actuating switch 16 is so arranged as to be closed in drive connection with the shutter release actuating member such as the shutter button 7, and the parallelly provided switch 17 is operationally related to the mechanically or electrically operating arrangement during shutter release operation so as to be kept closed at least until initiation of shutter closing operation. As a system where the current source circuit is closed in response to the shutter release actuation, the structure of the arrangement according to the present invention is simpler than conventional ones where the shutter button is latched at the depressed position until the shutter release is terminated. The shutter button operation of the camera according to the present invention can be carried out in the same manner as ordinary cameras since the uneasiness accompanying the operation of the shutter button of said conventional arrangement cameras is not felt by the user. Thus, a great advantage is obtained from the camera according to the present invention.

While there have been described and illustrated preferred embodiments of the present invention, it is apparent that numerous alterations, omissions and additions may be made without departing from the spirit thereof.

What we claim is:

1. In a camera including shutter means successively movable to open and closed positions, defining an exposure interval, a control network including a timing circuit and a switch circuit having an input coupled to said timing circuit and an exposure terminating means responsive to the output of said switch circuit for effecting the closure of said shutter, a current source for energizing said network, a pair of parallel normally open first and second switches connected between said current source and said control network, a shutter release member movable between advanced and retracted positions, retention means movable to an advanced position to close and releasably maintain said second switch in a closed condition and to a retracted position, means responsive to the advance of said shutter release member for closing said first switch and actuating said retention means to close said second switch and thereafter initiating the opening of said shutter, and means for returning said retention means to a position opening said second switch following the initiation of the closing of said shutter.

2. The camera of claim 1, said switching means including a switch closing member spring urged toward an advancing position urging said second switch to a closed position, and means responsive to said shutter release member for releasably latching said switch closing member in a retracted position.

3. The camera of claim 2 including means responsive to the closing of said shutter for retracting said switch closing member to a latched retracted position.

4. The camera of claim 1 wherein said exposure terminating means includes a solenoid connected to the output of said network.

5. The camera of claim 1 wherein said timing circuit includes a resistor and a capacitor.

6. The camera of claim 1, wherein said timing circuit includes a resistor and a capacitor, and including a normally closed switch shunting said capacitor and opened with the opening of said shutter.

7. The camera of claim 6, wherein said resistor comprises a photoconductor.

8. In a camera including shutter means successively movable to open and closed positions, defining an exposure interval, a control network including a timing circuit and a switch circuit having an input coupled to said timing circuit and an exposure terminating means responsive to the output of said switch circuit for effecting the closure of said shutter, a current source for energizing said network, a pair of parallel first and second switches connected between said current source and said network, said first switch being actuatable in response to the position of said shutter release member, and means responsive to said circuit output for actuating and maintaining said second switch in a closed position and for opening said second switch upon the initiation of the closing of said shutter.

9. The camera of claim 8 including a solenoid connected to the output of said network said second switch being actuated by said solenoid.